3,116,994
INHIBITING PLANT GROWTH WITH 6-AZA-
URACIL AND SALTS THEREOF
Alvaro M. Goenaga, New York, N.Y., assignor to Chas.
Pfizer & Co., Inc., New York, N.Y., a corporation of
Delaware
No Drawing. Filed Dec. 11, 1961, Ser. No. 158,590
4 Claims. (Cl. 71—2.5)

This invention relates to novel agricultural compositions useful for regulating plant growth. More particularly, it is concerned with such compositions that contain 6-azauracil or various salts thereof as their essential active ingredient. It is also concerned with the process of using these type compounds or their agricultural compositions for the aforestated purpose.

In accordance with the present invention, it has now been surprisingly discovered that 6-azauracil is a plant growth regulator (or inhibitor), i.e., it will inhibit the growth of a plant when it is applied to the leaves thereof or to the soil in which it is grown. This may be done by either administering the compound directly or by diluting it first in a suitable agriculturally-acceptable extending agent. Inasmuch as 6-azauracil is an acidic compound, various metal and amine addition (including ammonium) salts of this compound may be readily prepared and used for the purposes of this invention. Of particular value in this connection are the alkali metal and alkaline-earth metal salts of 6-azauracil, such as the sodium, potassium, lithium, calcium, barium and strontium salts, as well as the corresponding ammonium and organic amine addition salts, such as the ethanolammonium, diethylammonium, triethylammonium, pyridinium and piperidinium salts. These compounds all possess an appreciable degree of water-solubility and hence, they can easily be used for administrative purposes in this way.

Other agriculturally-acceptable extending agents or diluents, besides water, include almost any known commercially available extending agent or carrier currently being used in the agricultural field for just such purposes. This would embrace certain common organic solvents such as acetone or carbon tetrachloride, low-boiling liquids such as Freon, semi-solid viscous carriers such as petroleum jelly or soap and solids such as potting soil, chalk, talc, clay, etc. Hence, it is possible to administer a compound of this invention in such diverse forms as a powder, dust, spray, aerosol, suspension, emulsion or solution. The preferred form, however, and particularly when one is using one of the aforementioned water-soluble salts of 6-azauracil is an aqueous solution. A particularly preferred composition will also include a wetting agent, such as a sulfonated vegetable oil like the Tweens, i.e., polyoxyalkylene derivatives of sorbitan monolaurate. Other wetting agents suitable for use in this connection include the sulfates of various secondary alcohols in the Tergitol series, such as the monosodium salt of 2-methyl-7-ethylundecanol-4 sulfate (Tergitol-4), as well as various sulfosuccinate esters such as the monosodium salt of di(2-ethylhexyl) sulfosuccinate (or Aerosol OT).

In carrying out the process of this invention, it is only necessary that the 6-azauracil component be present in the herein described agricultural compositions at concentration levels which are sufficient to inhibit the growth of a plant. Generally speaking, this will require a concentration level of about 5 p.p.m. for the active ingredient. Although some growth inhibitory effects are actually obtained by using less than this amount, the results obtained may be variable at times so that it is usually not advisable to go too far below the aforesaid lower limit if optimum conditions for producing these effects are sought. Needless to say, larger amounts of active ingredient, such as up to 2,000 p.p.m. may also be employed, particularly when the growing plant or seedling rather than the seed itself is the subject to be treated.

When the 6-azauracil compounds of this invention are used in the herein prescribed manner, a definite retardation in the growth of seedlings is observed to occur with such diverse type plants as peas, beans, cucumbers, wheat, barley, corn, turnips, radishes, tomatoes, rye grass and cotton. By growth retardation or inhibition we mean root inhibition, leaf defoliation, stem shortening and even, in some cases, the complete suppression or eradication of the plant itself. In this connection, it should be noted that these compounds are particularly effective when used as pre-emergence herbicides. Thus, they are of definite value as growth inhibitory agents which are useful for shortening the stem height of certain crops that might otherwise tend to become subject to wind damage or difficult to harvest. Furthermore, they can also be used to overcome excessive stem length in an otherwise desirable crop variety such as beans, in addition to stretching out their rate of development in selected plots so as to extend production through the season from a single planting. In this manner, plantings can also be kept in proportion to small lots that are common to many areas where there is only a limited amount of land available for such use.

This invention is further illustrated by the following examples, which are not to be construed in any way as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

Fifteen black-seeded, Blue Lake bean seeds were planted in a deep soil flat measuring 1 ft. x 1.5 ft. and filled to 3.5 inches in height with soil weighing 25 lbs. The following day, a solution consisting of 77.9 mg. of the monosodium salt of 6-azauracil monohydrate dissolved in two liters of water was poured directly on the flat. This amounted to a concentration level in the soil of 5 lbs. per acre. Six days after treatment, the seedlings were observed and compared to those grown under identical conditions except that they did not receive the 6-azauracil treatment but only two liters of pure water instead. In this way, it was found that while the control plants were growing normally, the treated plants were small and burned lightly with the primary leaves scarcely appearing and the trifoliate leaves completely absent.

*Example II*

Fifteen Laxton Progress Dwarf pea seeds were soaked for one hour in an aqueous solution consisting of 100 mg. of monosodium 6-azauracil monohydrate dissolved in 50 ml. of water. A second set of seeds was soaked for one hour in 50 ml. of pure water. The seeds were then planted in sand culture and thirteen days later observations as to germination were made. It was found that while three of the control seeds had germinated to give small but healthy plants, only two of the treated seeds had germinated and in both cases the plants so obtained were very small and badly burned with no leaf spreadage at all.

*Example III*

Five Woodruff cucumber seeds were planted in a pot containing 2.5 lbs. of sand culture as soil. An aqueous solution consisting of 7.8 mg. of monosodium 6-azauracil monohydrate dissolved in 200 ml. of water was then poured directly on the newly planted seeds. This amounted to a concentration level in the soil of 5 lbs. per acre.

A second set of seeds was grown in another pot as control; this pot received no 6-azauracil but only 200 ml. of pure water instead. Fifteen days later, the following differences with respect to stem weight and leaf weight were recorded:

| Treatment | Stems, g. | Leaves, g. |
|---|---|---|
| Control | 0.091 | 0.210 |
| 6-Azauracil | 0.059 | 0.109 |

*Example IV*

The procedure described in Example III was followed except that the seeds employed were those of Sweet Golden Cross bantam corn. The results obtained with respect to root, stem and leaf growth are tabularized below in the following table:

| Treatment | Roots, g. | Stems, g. | Leaves, g. |
|---|---|---|---|
| Control | 0.294 | 0.090 | 0.227 |
| 6-Azauracil | 0.194 | 0.070 | 0.193 |

*Example V*

Twenty Knox wheat seeds were planted in two different soil flats containing 25 lbs. each of screened outdoor compost as soil. The soil of one flat also contained 155.8 mg. of monosodium 6-azauracil monohydrate which was thoroughly blended therein, while the soil contained in the other flat was untreated. Each flat was then watered daily with one liter of water for a period of nine days. At the end of this time, no germination could be observed in the treated flat, whereas the control flat exhibited a total of seven seedlings averaging 3–6 cm. in length.

*Example VI*

The procedure described in Example V was repeated using Bonny Best tomato seeds in place of the wheat seeds with comparable results being obtained, i.e., no germination could be observed in the treated flat, whereas the controls exhibited a total of thirteen plant seedlings each averaging 2 cm. in length.

*Example VII*

The procedure described in Example VI was followed except that the control is treated after ten days of growth with a spray consisting of an aqueous solution of 31.2 mg. of monosodium 6-azauracil monohydrate dissolved in 20 ml. of water. A total of 18 ml. of said solution was used or roughly 1 ml. for each of the eighteen plant seedlings present on the tenth day of growth. Two weeks later, it was found that all the controls that had been so treated were now wilted without having even passed the primary stage of growth.

*Example VIII*

Three-week old Bonny Best tomato slant seedlings growing in pots each containing 538 g. of soil (with three plants per pot) were treated with different concentration levels of monosodium 6-azauracil monohydrate in aqueous solution, the compound being watered directly unto the soil using 75 ml. of aqueous solution in each case. The concentration levels employed were 1000, 500, 100, 50, 10 and 5 p.p.m., respectively, in addition to the untreated controls. Five days later, visual differences in size and shape could be clearly observed even in the case of the plant that had been treated with the weakest solution.

*Example IX*

A mixture consisting of 100 g. of pulverized calcium carbonate, 1 g. of slaked lime and 2 g. of olein is prepared. To this mixture there is then added a sufficient amount of the barium salt of 6-azauracil to give the resulting blend a total concentration of 100 p.p.m. with respect to the active ingredient. After thorough grounding in a ball mill, the resulting powder is found to have good adhesive properties in addition to being easily scattered. It is effective as a growth inhibitor when applied to plants.

*Example X*

A mixture consisting of 5 mg. of the calcium salt of 6-azauracil, 4 g. of casein, 4 g. of sodium dibutylnaphthalenesulfonate, 5 g. of sodium carbonate and 25 g. of talc is ground together in a ball mill. To this mixture there is then added an equal quantity of calcium carbonate, which is subsequently blended in. The resultant powder gives a stable growth-inhibiting composition when suspended in water. The suspension may be prepared immediately before use and is particularly applicable for spraying applications.

*Example XI*

A solution consisting of 10 mg. of 6-azauracil dissolved in 20 g. of xylene and 80 g. of Turkey-red oil is prepared. This solution is readily emulsified with water and the resultant emulsion found to be useful as a spray.

*Example XII*

An aqueous solution consisting of 0.001% by weight of monopotassium 6-azauracil dissolved in water is treated with 0.1% by volume of Tween 80 (a mixture of polyethylene ethers of mixed partial oleic acid esters of sorbitol anhydride, available commercially from the Atlas Powder Corp.). The resultant solution is useful as a foliar spray for inhibiting plant growth.

In like manner, the monolithium salt of 6-azauracil may be substituted for the corresponding monopotassium salt in the above composition with comparable results being obtained.

*Example XIII*

A 0.02% solution of 6-azauracil in acetone is prepared and used to treat plant seeds by immersing them therein, and then evaporating the solvent from the resulting mixture under reduced pressure.

*Example XIV*

A powdered mixture of talc and 0.04% by weight of the strontium salt of 6-azauracil is prepared. This mixture is found to be useful for treating plant seeds with the active ingredient of this invention.

*Example XV*

A solution of 15 mg. of 6-azauracil in 4 g. of acetone and 100 g. of Freon-12 is prepared and used as a plant growth inhibitor in aerosol form.

*Example XVI*

The alkali metal and alkaline-earth metal salts of 6-azauracil that were used in the foregoing examples were all prepared in accordance with the procedure described by J. J. Ursprung in U.S. Patent No. 2,956,924, issued on October 18, 1960. In like manner, the corresponding magnesium, manganous, cuprous, zinc, ferrous and cobaltous salts of 6-azauracil are similarly prepared by merely employing the appropriate metal hydroxide in each case. When two moles of alkali metal hydroxide are employed with respect to one mole of 6-azauracil in accordance with this very same reaction procedure, the corresponding di-alkali metal salts are the products obtained.

*Example XVII*

The procedures of Examples V–VI are repeated except that the magnesium salt of 6-azauracil is employed in place of the corresponding monosodium salt with substantially the same results being obtained. In like manner, the use of the corresponding manganous, cuprous, zinc, ferrous and cobaltous salts in this same procedure affords substantially the same results in each and every case.

Example XVIII

The ammonium salt of 6-azauracil is prepared by dissolving said acidic compound in dilute aqueous ammonia, i.e., one volume of concentrated ammonia to two volumes of water. The resulting solution is then evaporated to dryness by heating same on a steam bath until the desired salt is obtained. In like manner, the ethanolammonium, diethylammonium, triethylammonium, pyridinium and piperdinium salts of 6-azauracil are similarly prepared by merely employing the appropriate amine in lieu of ammonia.

Example XIX

The procedures of Examples I–IV are followed except that the ammonium salt of 6-azauracil prepared as described in the previous example is employed in the solution as the essential active ingredient in lieu of the corresponding monosodium salt. In the same manner, the amine addition salts prepared in the aforementioned example are also each individually employed in place of the sodium salt as the active compound of this solution. In each of these cases, the results obtained are substantially the same as those previously reported in the case of the monosodium salt of 6-azauracil. In like manner, the use of 6-azauracil itself in aqueous solution affords results which are comparable to those reported in the first four examples.

What is claimed is:

1. A process for regulating plant growth, which comprises contacting a plant with a growth-inhibiting amount of a compound selected from the group consisting of 6-azauracil and the alkali metal, alkaline-earth metal, ammonium and amine addition salts thereof.

2. A process as claimed in claim 1 wherein the compound employed is an alkali metal salt of 6-azauracil.

3. A process as claimed in claim 1 wherein the compound employed is admixed with an agriculturally-acceptable extending agent.

4. A process for inhibiting plant growth, which comprises contacting a plant with an effective amount of a composition consisting essentially of an agriculturally-acceptable carrier and at least about 0.0005% by weight of a compound selected from the group consisting of 6-azauracil and the alkali metal, alkaline-earth metal, ammonium and amine addition salts thereof.

References Cited in the file of this patent

UNITED STATES PATENTS

| | | |
|---|---|---|
| 2,956,924 | Ursprung | Oct. 18, 1960 |
| 2,969,364 | Lyttle | Jan. 24, 1961 |
| 3,021,328 | Morin et al. | Feb. 13, 1962 |